United States Patent [19]

Kimura

[11] Patent Number: 5,445,261
[45] Date of Patent: Aug. 29, 1995

[54] MECHANISM FOR ATTACHING TROUGH TO VIBRATING FEEDER

[75] Inventor: Takashi Kimura, Shiga, Japan

[73] Assignee: Ishida Co., Ltd., Japan

[21] Appl. No.: 380,451

[22] Filed: Jan. 26, 1995

Related U.S. Application Data

[63] Continuation of Ser. No. 309,517, Sep. 20, 1994, abandoned, which is a continuation of Ser. No. 94,097, Jul. 29, 1993, abandoned.

[30] Foreign Application Priority Data

Feb. 3, 1992 [JP] Japan .............. 4-010880 U

[51] Int. Cl.⁶ .............................................. B65G 27/08
[52] U.S. Cl. ...................................... 198/763; 198/759
[58] Field of Search ............... 198/750, 752, 759, 763, 198/771

[56] References Cited

U.S. PATENT DOCUMENTS

| | | | |
|---|---|---|---|
| 2,706,112 | 4/1955 | Carrier, Jr. .................. | 198/763 X |
| 3,134,483 | 5/1964 | Musschoot et al. ......... | 198/763 X |
| 5,277,300 | 1/1994 | Maggioni .................... | 198/759 |

FOREIGN PATENT DOCUMENTS

| | | |
|---|---|---|
| 57-22019 | 2/1982 | Japan . |
| 62-02508 | 1/1987 | Japan . |
| 63-196407 | 8/1988 | Japan . |
| 1-147320 | 10/1989 | Japan . |
| 0816889 | 3/1981 | U.S.S.R. .............................. 198/763 |
| 0823244 | 4/1981 | U.S.S.R. .............................. 198/752 |

*Primary Examiner*—James R. Bidwell
*Attorney, Agent, or Firm*—Majestic, Parsons, Siebert & Hsue

[57] ABSTRACT

A mechanism for attaching a trough on top of a base of a vibratory feeder adapted to vibrate in a specified direction includes a pair of mutually engageable couplers, one attached to the bottom surface of the trough and the other attached to the top surface of the base. Either one of them is protruding and the other is indented such that the former can be tightly inserted into the latter. The protrusion and the indentation of these couplers are so oriented with respect to the direction of vibrations of the base that the total force on the coupler attached to the base obtained by vectorially summing the force of vibration acceleration and the load of the trough will always have a component in the direction in which the protrusion and indentation of the couplers are oriented so as to keep these couplers engaged together. The direction of the protrusion and indentation is substantially perpendicular to the direction of vibrations of the base such that the vibrations of the base can be efficiently propagated to the trough.

15 Claims, 4 Drawing Sheets

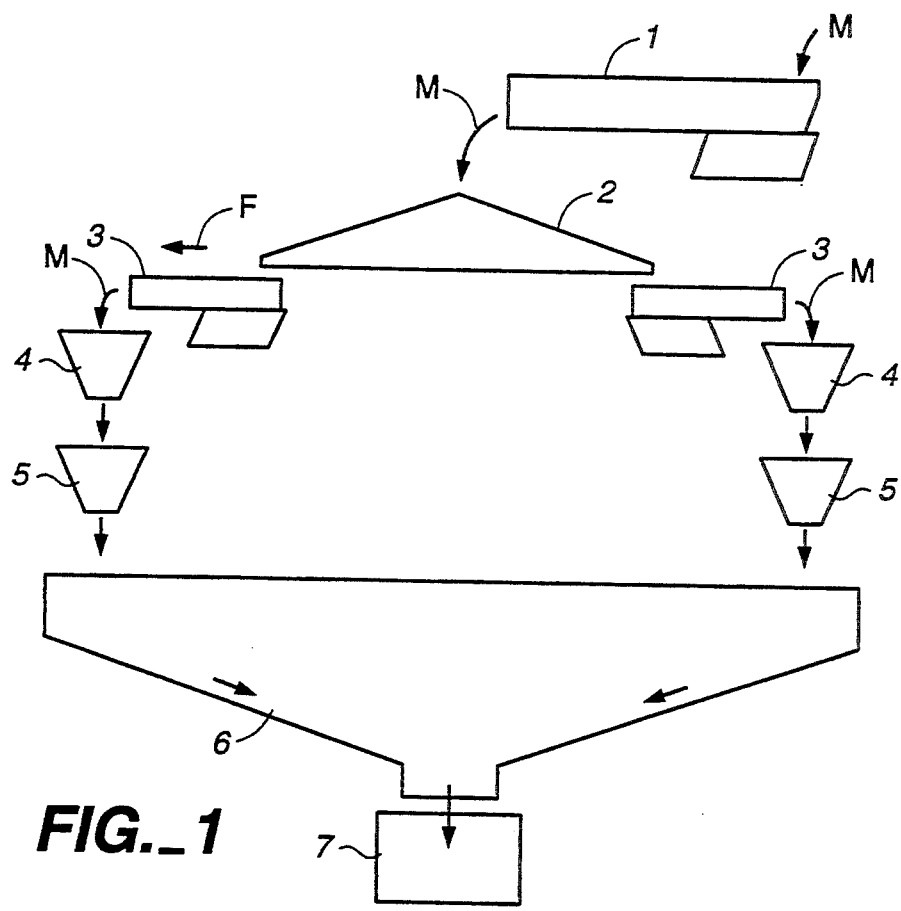
FIG._1
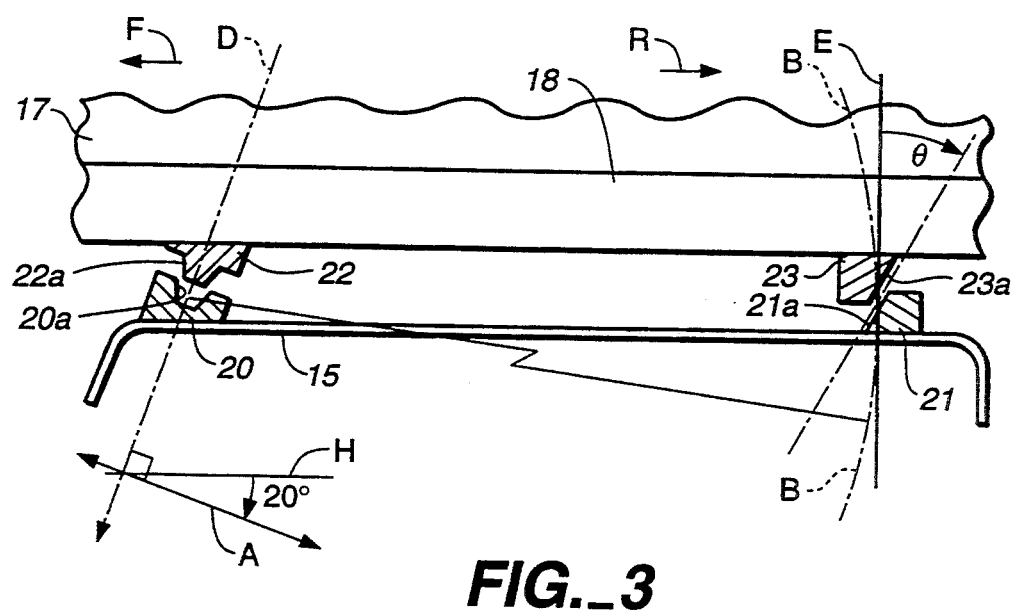
FIG._3

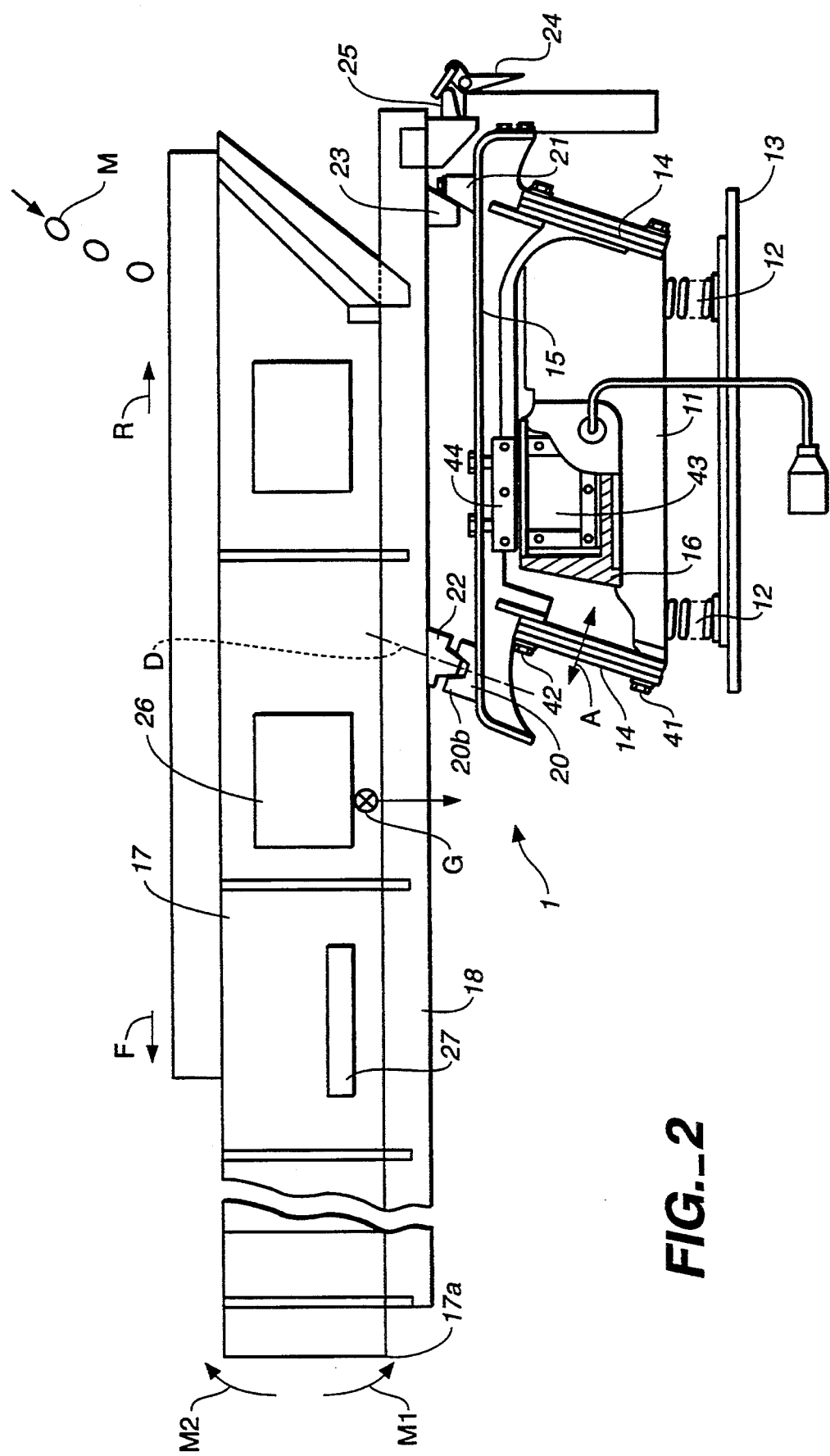
FIG._2

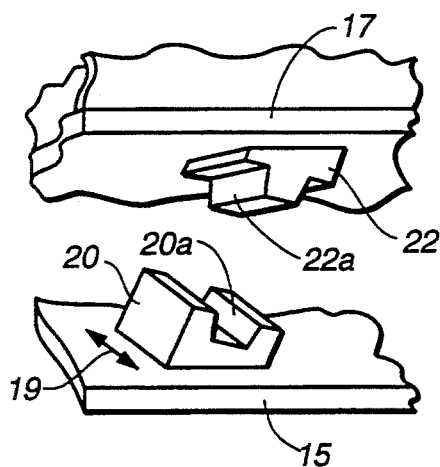
FIG._4A
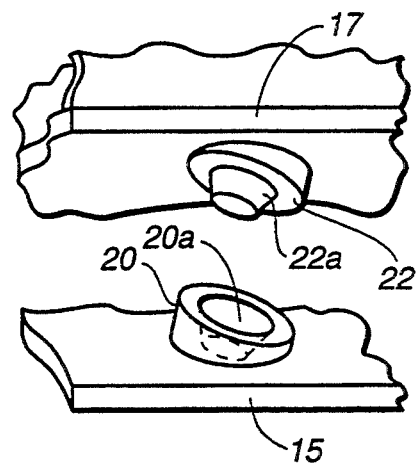
FIG._4B
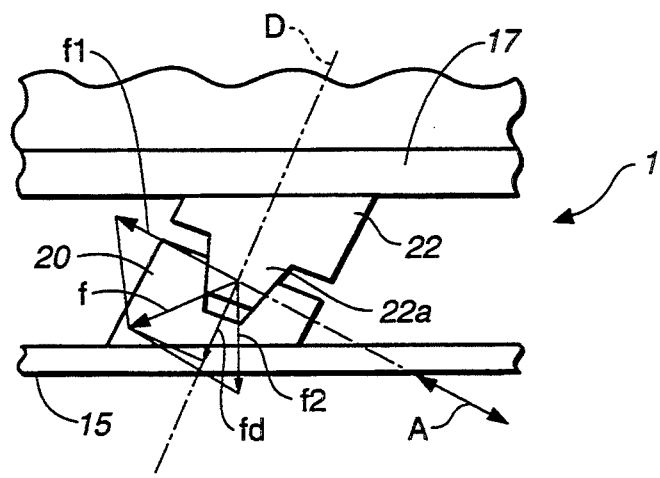
FIG._5
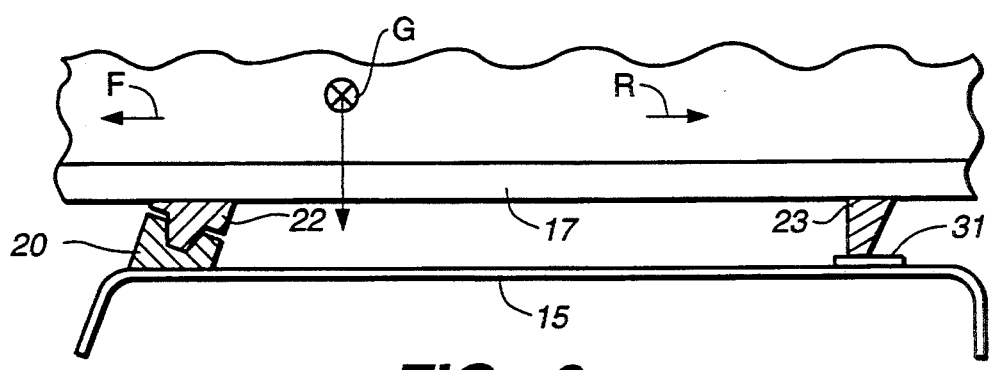
FIG._6

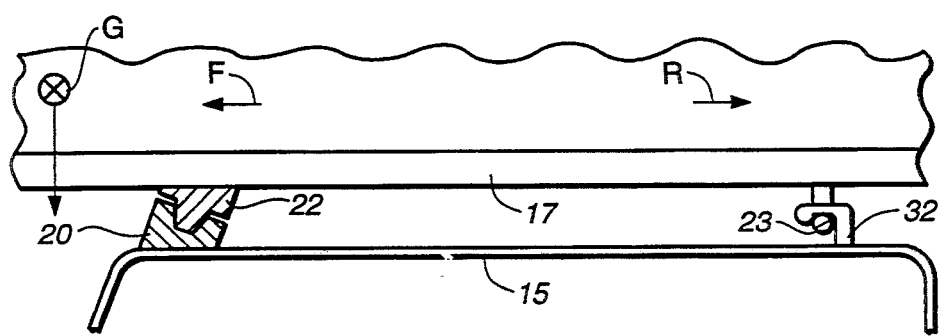
FIG._7
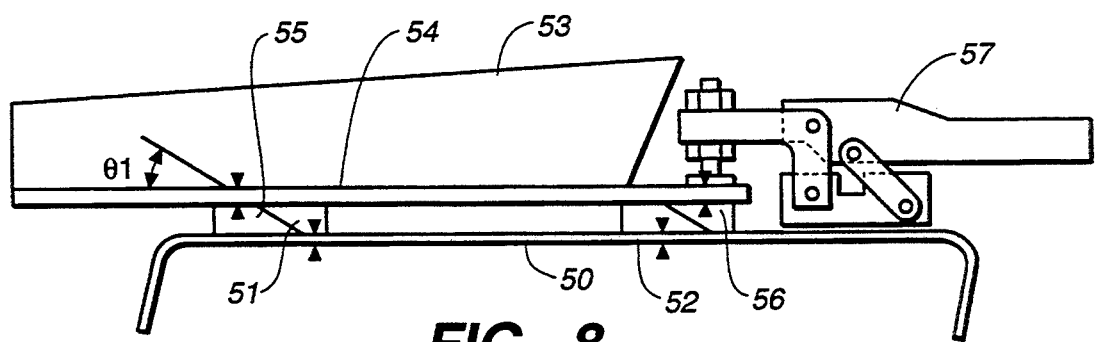
FIG._8
*(PRIOR ART)*

MECHANISM FOR ATTACHING TROUGH TO VIBRATING FEEDER

This is a continuation of application Ser. No. 08/309,517 filed Sep. 20, 1994, now abandoned, which is a continuation of application Ser. No. 08/094,097 filed Jul. 29, 1993, now abandoned.

BACKGROUND OF THE INVENTION

This invention relates to a mechanism for attaching a trough to a vibratory feeder of the kind principally used for a combinational weighing machine for supplying articles to weigh hoppers for weighing.

Vibratory feeders such as electromagnetic feeders have been in use, for example, for a combinational weighing machine adapted to supply articles to be weighed to many weigh hoppers for weighing, to select a combination of a plurality of such weigh hoppers that will provide a total weight which may be the closest to a target weight, to cause the articles to be discharged from these selected weigh hoppers, and to obtain products by packaging those discharged articles at a later stage. Electromagnetic feeders have been in use for supplying the articles to be weighed to the weigh hoppers.

An electromagnetic feeder is typically comprised of a trough-supporting base which is supported by a plate spring and is adapted to be vibrated and a trough which is affixed to this base and serves to receive articles (to be weighed) at a backward section and to transport them in a forward direction by a resonance phenomenon as the trough is vibrated by an electromagnetic mechanism. Japanese Utility Model Application Jikkai 62-96009 disclosed a trough-attaching mechanism for such an electromagnetic feeder characterized wherein a trough and a trough-supporting base are removably attached to each other by screws. With a trough-attaching mechanism of this kind, however, screws become loose after a use over a long period of time. In view of the above, the present applicant proposed, in Japanese Utility Model Publication Jikko 62-2508, a new trough-attaching mechanism which does not cause the screws to become loose.

As shown in FIG. 8, this mechanism is characterized as having a trough-supporting base 50 supporting at a forward position and a backward position on its upper surface a front positioning member 51 having a downwardly facing inclined surface and a back positioning member 52 having an upwardly facing inclined surface, respectively. A front contact member 55 and a back contact member 56 each having a slope contacting the inclined surface of the aforementioned front and back positioning members 51 and 52, respectively, are affixed to a bottom plate 54 of a trough 53. Mutually corresponding pairs of positioning members 51 and 52 and contact members 55 and 56 are pressed against each other across their inclined surfaces so as to properly position the trough 53 with respect to the base 50. The trough 53 is fastened to the base 50 by means of a clamping mechanism 57 comprising a toggle means at a backward position of the base 50 such that the bottom plate 54 of the trough 53 is pressed downward and the back positioning member 52 and the back contact member 56 are strongly compressed against each other.

This mechanism has the advantage of providing a high vibration-transmitting efficiency to the trough 53. If the slope $\theta_1$ of the inclined surface is made small, however, it becomes necessary to slide the trough 53 at a small angle against the base 50 in order to assemble them together. Since the assembly work will be difficult to perform in such a situation, the slope $\theta_1$ must be made larger than the angle of propagation of vibrations (usually 20° from the horizontal). As a result, the upwardly directed component of the force of the vibratory acceleration comes to act significantly on the clamping mechanism 57. In the case of a large feeder with the front and back positioning members separated by a large distance, in particular, the inclined surfaces vibrate so as to hit against each other and to separate from each other (that is, they vibrate relative to each other) due to the bending of the trough 53 itself unless the rigidity of the trough 53 is extremely high, and there is a large noise produced and propagated to the environment.

The present invention has been accomplished in order to eliminate these problems, and it is an object of the invention to provide an improved trough-attaching mechanism capable of securely fastening a trough to a trough-supporting base without causing noise to be generated due to relative vibrations between them.

SUMMARY OF THE INVENTION

A mechanism for attaching a trough to a vibratory feeder according to the present invention, with which the above and other objects can be attained, may be characterized as comprising a pair of mutually engageable pieces (hereinafter referred to as couplers), one of which having a protrusion and the other an indentation. Either one of these couplers is attached to the upper surface of a trough-supporting base adapted to be vibrated, and the other one is attached to the lower surface of the trough such that the protrusion on one of them can be inserted into the indentation on the other and that the pieces can be thereby engaged tightly together. These pieces are oriented such that the total force on the piece attached to the trough, being the vectorial sum of a first force due to the vibratory acceleration of the base and a second force due to the load of the trough, will always have a component in the direction of mutually engaging the two pieces. The indentation may be formed as a tapered groove, and the protrusion with correspondingly tapered outer surfaces.

With a mechanism thus structured, the trough can be securely attached to the supporting base merely by tightly joining together the couplers attached individually thereto, while the trough and the base are accurately positioned with respect to each other. When they are thus attached together, relative vibrations therebetween, which would cause them to collide with each other, can be eliminated, and generation of noise caused by such relative vibrations can also be prevented.

Moreover, since the sum of the aforementioned first force caused by the vibratory acceleration of the base and the second force due to the load of the trough has a component in the direction of keeping the two couplers engaged together, there is no danger that they become disengaged from each other during an operation.

According to a preferred embodiment of the invention, the direction of the aforementioned protrusion and indentation is set so as to be approximately perpendicular to the direction of vibrations of the base such that the vibrations can be effectively transmitted from the base through these couplers to the trough. The feeder can thus be operated with a maximum efficiency for transporting articles thereon. Since the vibratory acceleration of the base has no component perpendicular to the direction of vibrations, the probability of the couplers becoming disengaged is extremely small.

According to another preferred embodiment of the invention, these couplers are at a forward position on the base with respect to the direction of motion of the articles transported by the feeder. A leg piece is provided on the bottom surface of the trough, and a supporting piece having a supporting surface for supporting this leg piece-thereon is provided at a backward position on the base. This supporting surface is sloped backward with respect to the tangent to the circle having its center at the couplers set on the base where this circle crosses the supporting surface. Thus, the trough can be set easily on the base, first by joining the couplers at the forward position and then rotating the back end of the trough downward around the joined couplers such that the leg piece on the trough is placed on the supporting surface of the supporting piece on the base. Even if the distance between the couplers at the forward position and the leg piece at the backward position is not precisely correct due to a dimensional error, the trough and the base can be securely attached together according to this preferred embodiment of the invention by absorbing such an error.

If the aforementioned supporting surface is set approximately perpendicular to the direction of vibrations of the base, furthermore, the efficiency of propagating vibrations from the supporting piece to the leg piece on the trough can be improved. Moreover, if the supporting piece on the base is formed with an elastic material, it can be penetrated by the leg piece. Collisions between the leg piece and the supporting piece, and hence the generation of noise, can be thereby prevented even more effectively.

BRIEF DESCRIPTION OF THE DRAWINGS

The accompanying drawings, which are incorporated in and form a part of this specification, illustrate some embodiments of the invention and, together with the description, serve to explain the principles of the invention. In the drawings:

FIG. 1 is a schematic side view of a weighing machine in which vibratory feeders embodying the present invention are used;

FIG. 2 is a side view of an attaching mechanism for a vibratory feeder according to a first embodiment of the invention;

FIG. 3 is a side view showing an essential part of the attaching mechanism of FIG. 2;

FIG. 4a is a diagonal view of the coupling part of the attaching mechanism of FIGS. 2 and 3, and FIG. 4b is a diagonal view of a variation of this coupling part;

FIG. 5 is a side view of the forces acting on the coupling part;

FIG. 6 is a side view of another attaching mechanism for a vibratory feeder according to a second embodiment of the invention;

FIG. 7 is a side view of still another attaching mechanism for a vibratory feeder according to a third embodiment of the invention; and FIG. 8 is a side view of an example of prior art attaching mechanism for a vibratory feeder.

DETAILED DESCRIPTION OF THE INVENTION

In what follows, examples of the present invention are described with reference to drawings.

As shown in FIG. 1, which is a schematic side view of a combinational weighing machine using vibratory feeders according to the present invention, a first vibratory feeder 1 disposed at an elevated position serves to receive articles to be weighed M such as candies and fish sent from a production line and to drop them at the center of a conically shaped dispersion feeder 2, while vibrating at a specified amplitude and with a specified frequency. A large number of second vibratory feeders 3 are radially disposed around the outer periphery of the dispersion feeder 2. These vibratory feeders 3 are each adapted to vibrate at a specified amplitude and with a specified frequency to thereby transport outward (as shown by the arrow F) the articles M dropped from the peripheral parts of the dispersion feeder 2, causing them to drop via pool hoppers 4 into weigh hoppers 5. Combinational calculations are performed on the weighed values obtained from the weigh hoppers 5, and a particular combination of a plurality of weigh hoppers 5 providing a total weight that is the closest to a target weight is selected. The articles M are discharged from these selected weigh hoppers 5 into a discharge chute 6, and the discharged articles M are packaged by a packaging machine 7 such that packaged products are obtained.

FIGS. 2–5 show a first vibratory feeder 1 according to a first embodiment of the invention. In FIG. 2, numeral 11 indicates a base member attached to a base plate 13 through coil springs 12 serving as vibration insulating means. A pair of plate springs 14 is attached to both ends of the base member 11 by bolts. A trough-supporting base 15 is attached to the free ends of these plate springs 14 by bolts 42. Numeral 16 indicates a hollow, sealed housing structure containing an electromagnet 43 in an airtight manner therein in order to protect it from dust and humidity. A detailed description of this housing structure 16 has been given in Japanese Utility Model Publication Jikko 2-21453 and hence will not be repeated herein. With this housing structure 16 fastened onto the base member 11 and a mobile iron core 44 affixed to the underside of the trough-supporting base 15, a vibratory system including the base 15 affixed to the free ends of the plate springs 14 and a trough 17 of stainless steel affixed thereto can be vibrated in the direction of arrow A with a specified amplitude by electromagnetically deforming the plate springs 14. The trough 17 is provided with a peephole 26 and a handle 27 on a side surface.

On the upper surface of the trough-supporting base 15 at a forward position and a backward position with respect to the direction of transportation of the articles M (indicated by arrow F), there are an indented coupler 20 and a supporting piece 21. On the bottom surface of a base plate 18 of the trough 17 at positions corresponding to the aforementioned coupler 20 and supporting piece 21, there are respectively a protruding coupler 22 and a leg piece 23. As will be explained below, these couplers 20 and 22, the supporting piece 21 and the leg piece 23 together serve to support the trough 17 securely on the trough-supporting base 15 so as not to produce noise due to vibrations.

The front coupler 20 on the trough-supporting base 15 is made of a metallic material, is cross-sectionally in an indented form as shown in FIG. 3, and is affixed to the base 15 obliquely in a direction approximately perpendicular to the direction of vibrations A. A groove 20a, which is tapered so as to become narrower at deeper parts, is formed on the upper surface of the front coupler 20, extending in a straight line in the lateral (left-to-right) direction of the trough 17, as shown by arrows 19 in FIG. 4a.

The protruding coupler 22 on the base plate 18 of the trough 17, as shown in FIG. 3, is also metallic and inclined in a direction approximately perpendicular to the direction of vibrations A. This coupler 22 is provided with a protrusion 22a which is tapered so as to be narrower at its tip. This protrusion 22a is designed so as to engage with the inwardly facing sloped surfaces of the tapered groove 20a of the indented coupler 20 when it is inserted into this groove 20a such that the two couplers 20 and 22 engage tightly with each other. The tapered groove 20a and the protrusion 22a, however, need not be shaped as shown in FIG. 4a. They may be conically shaped, for example, as shown in FIG. 4b.

In summary, the two couplers 20 and 22 are both obliquely installed so as to be substantially perpendicular to the direction of vibrations A. They are designed, as will be explained in detail below, such that the vector sum of the first force due to the vibratory acceleration of the trough-supporting base 15 and the second force due to the load on the trough 17 (including the weight of the trough 17 itself, the weight of the articles M carried by the trough 17 and a compressive force which may be on the trough 17 by a clamping device 24), acting on the coupler 22 on the trough 17, will always be so directed as to keep the two couplers 20 and 22 joined together.

According to the embodiment illustrated in FIG. 3, the angle of the direction of vibrations A (that is, the angle of propagation of vibrations) is set to be 20° from the horizontal H. Thus, the direction of indentation and protrusion D of the couplers 20 and 22 is tilted from the vertical by approximately 20° so as to be substantially perpendicular to the direction of vibrations A.

The supporting piece 21 at a backward position (with respect to the direction of transportation of the articles M) is made of a strong and elastic material such as urethanes. Its frontal supporting surface 21a is sloped by an angle $\theta$ in the backward direction R from the line E tangent to the arc of circle B with its center at the coupler 20 on the trough-supporting base 15 where it crosses the circle B. Since this tangent line E is substantially vertical, the angle between the supporting surface 21a and the direction of vibrations A will become smaller than 65° if the angle $\theta$ exceeds 45° and the propagation angle of vibrations is 20°. This will have the adverse effect of reducing the efficiency of propagating vibrations. Thus, it is preferred that the angle $\theta$ be smaller than 45°.

According to the embodiment herein described, the angle $\theta$ is set approximately equal to 30° such that the supporting surface 21a is approximately perpendicular to the direction of vibrations A, the crossing angle being about 80°. The angle of the supporting surface 21a from the vertical is about 30°, and the contact surface 23a of the metallic leg piece 23 on the trough 17 is also tilted by about 30° from the vertical so as to be parallel to the supporting surface 21a. Accordingly, if the coupler 22 on the trough 17 is inserted into the coupler 20 on the trough-supporting base 15 and the leg piece 23 on the trough 17 is deposited on the supporting surface 21a of the supporting piece 21 by using the coupler 20 as fulcrum, the contact surface 23a of the leg piece 23 contacts the supporting surface 21a without leaving a gap in between.

At the backward end of the trough-supporting base 15, there is provided a clamping device 24 comprising a toggle means, as shown in FIG. 2, serving to tighten the base plate 18 of the trough 17 on the trough-supporting base 15 by hooking onto a latch 25 on the base plate 18 at its back part. The center of gravity G of the trough 17 (that is, the center of gravity of the trough itself not subjected to the weight of any articles or the compressive force by the clamping device 24) is in front (in the forward direction F) of the coupler 22. Consequently, the clamping device 24 also serves to prevent the trough 17 from rotating forward around the coupler 22.

For assembling the mechanism thus structured, the protruding coupler 22 on the trough base plate 18 is initially engaged with the indented coupler 20 located correspondingly at a forward position on the trough-supporting base 15, and the leg piece 23 is subsequently placed on the supporting piece 21 at a backward position on the trough-supporting base 15. Finally, the back part of the base plate 18 is clamped onto the trough-supporting base 15 by means of the clamping device 24 such that the couplers 20 and 22 become engaged with each other near the front along the line D substantially perpendicular to the direction of vibrations A, while the leg piece 21 and the supporting piece 21 near the back come to contact each other tightly across the supporting surface 21a and the contact surface 23a which are also substantially perpendicular to the direction of vibrations A. In this way, vibrations of the trough-supporting base 15 can be efficiently propagated to the trough 17 through the couplers 20 and 22, the supporting piece 21 and the leg piece 23, that is, the efficiency of propagating vibrations can be improved such that the articles M can be transported with a maximum efficiency.

Since the two couplers 20 and 22 are tightly engaged to each other due to the load of the trough 17, there is no rattling between the trough 17 and the trough-supporting base 15. In other words, the trough 17 can be tightly set, while accurately positioned on the base 15. Moreover, since the couplers 20 and 22 are tightly in contact with each other and there is no gap therebetween, there are no relative vibrations which would tend to cause them to repeatedly hit against or separate from each other. In other words, generation of noise due to the relative vibrations between the couplers 20 and 22 can be prevented.

The same is true with the contact between the leg piece 23 and the supporting piece 21 which are tightly in contact with each other without leaving a gap in between. Not only can generation of noise due to their relative vibrations be prevented but also fluctuations in the distance between the couplers 20 and 22 at a forward position and the leg piece 23 and the supporting piece 21 at a backward position can be absorbed. Since the supporting piece 21 is formed with an elastic substance, furthermore, prevention of the generation of noise and absorption of dimensional fluctuations can be even more effectively accomplished.

As explained above, forward rotation of the trough 17 (indicated by arrow $M_1$ in FIG. 2), which tends to move the forward end 17a of the trough 17 downward while the trough 17 is attached to the trough-supporting base 15, can be prevented by the clamping device 24.

Backward rotation of the trough 17 (indicated by arrow $M_2$ in FIG. 2), which tends to move its forward end 17a upward with the leg piece 23 serving as fulcrum, is prevented because the protruding coupler 22 is in contact with the front wall 20b (indicated in FIG. 2) of the indented coupler 20. In summary, the trough 17 is attached to the trough-supporting base 15 extremely stably.

In order to securely attach the trough 17 to the trough-supporting base 15 to thereby prevent the generation of noise from vibrations, it is necessary to prevent the two couplers 20 and 22 from becoming disengaged from each other. Conditions therefor will be discussed next with reference to FIG. 5, which shows in detail the couplers 20 and 22 when they are engaged together. In FIG. 5, $f_1$ indicates a (first) force of the vibratory acceleration of the trough-supporting base 15 acting on the coupler 22 on the trough 17 through the other coupler 20. Another (second) force due to the load of the trough 17 is indicated by $f_2$. Of these two forces $f_1$ and $f_2$, the first $f_1$ changes its magnitude rapidly with time, reversing its direction along the direction of vibrations A, while the second force $f_2$ changes its magnitude, depending on the amount of the articles M on the trough 17, but its direction is always vertically downward. FIG. 5 illustrates the moment when the two couplers 20 and 22 are most likely to be disengaged, that is, when the first force $f_1$ is pointing diagonally upward and forward and the second force $f_2$ is at its smallest, pointing vertically downward.

According to this invention, the couplers 20 and 22 are so set that, even at the most unfavorable moment illustrated in FIG. 5 (that is, when they are most likely to become disengaged from each other), the total force f on the coupler 22 on the trough-supporting base 15 (that is, the vector sum of the forces $f_1$ and $f_2$) has a component $f_d$ in the direction of engaging the couplers 20 and 22 together (that is, a downwardly pointing component in the direction D of indentation and protrusion). Consequently, disengagement of the two couplers 20 and 22 is most effectively prevented.

Prevention of rattling between the trough 17 and the trough-supporting base 15 is realized according to the present invention by the tight contact between the two couplers 20 and 22. In other words, the tight coupling between the supporting piece 21 and the leg piece 23 according to the first embodiment of the invention described above may be dispensed with.

FIG. 6 shows a second embodiment of the invention wherein the aforementioned tight coupling between the supporting piece 21 and the leg piece 23 is omitted, the leg piece 23 being simply placed on top of the trough-supporting base 15. A buffering material 31 such as urethane is pasted on the upper surface of the base 15 where it contacts the leg piece 23, but it is not required if the relative vibrations between the leg piece 23 and the base 15 are sufficiently suppressed.

The second embodiment of the invention shown in FIG. 6 is further characterized wherein the center of gravity G of the trough 17 is located farther backward from the coupler 22 such that the trough 17 can be attached to the base 15 securely by means only of the two couplers 20 and 22 and the leg piece 23. If the center of gravity G is in the forward direction F from the coupler 22, a clamping device 24 as shown in FIG. 2 may be used to prevent the trough 17 from rotating forward around the coupler 22 serving as fulcrum.

FIG. 7 shows a third embodiment of the invention characterized as having a hooking member 32 at a back part of the base 15 and a leg piece 23 which is U-shaped as seen from the front and is adapted to be latched to this hooking member 32. The center of gravity G of the trough 17 itself is in the forward direction F from the coupler 22. Accordingly, the trough 17 is securely attached to the base 15 by means of the two couplers 20 and 22, the leg piece 23 and the hooking member 32, and is prevented from rotating forward around the coupler 22 serving as fulcrum.

Although the invention has been described above by way of only a limited number of embodiments, they are not intended to limit the scope of the invention. Many modifications and variations can be made thereon within the scope of the invention. For example, a protruding coupler (as shown at 22) may be attached to the trough-supporting base 15 and an indented coupler (as shown at 20) may be attached to the trough 17. It also goes without saying that the present invention can be applied to the second vibratory feeders 3 of FIG. 2. More generally, trough-attaching mechanisms according to this invention are applicable not only to vibratory feeders of a weighing machine but also to feeders which are used for sorting industrial machine parts or the like.

What is claimed is:

1. In a vibratory feeder having a base which has an upper surface and is adapted to be vibrated in a specified direction of vibration having a horizontal component, a mechanism for attaching to said base a trough for receiving articles and transporting said received articles forward thereon, said trough having a lower surface which is opposite and parallel to said upper surface of said base, said mechanism comprising:

a first coupler attached to said upper surface of said base; and a second coupler attached to said lower surface of said trough and being in a tightly engaged relationship with said first coupler by the weight of said trough, either one of said first and second couplers having an indentation in a specified coupling direction and the other of said first and second couplers having a protrusion also in said coupling direction and adapted to be inserted in said coupling direction into said indentation to thereby establish said engaged relationship between said first and second couplers, said coupling direction being transverse to said direction of vibration and oblique to the plane of said upper and lower surfaces, vibratory acceleration of said base applying a first force on said second coupler and the load from said trough applying a second force on said second coupler, said coupling direction being such that the vector sum of said first and second forces always has along said coupling direction a downward component which tends to keep said first and second couplers in said engaged relationship independent of the magnitude of said first force and to prevent said first and second couplers from sliding with respect to each other in said direction of vibration, wherein vibrations of said base are efficiently propagated to said trough.

2. The mechanism of claim 1 wherein said indentation is formed as a groove with tapered inner walls and said protrusion is formed with tapered outer walls which match said tapered inner walls when said couplers are engaged together.

3. The mechanism of claim 1 wherein said base is adapted to vibrate in a specified vibratory direction and said specified coupling direction is substantially perpendicular to said vibratory direction.

4. The mechanism of claim 1 wherein said first and second couplers are at a forward position on said base, a leg piece being attached to a backward position on said bottom surface of said trough and adapted to rest on said upper surface of said base.

5. The mechanism of claim 4 further comprising a supporting piece at a backward position on said base, said supporting piece having a supporting surface for supporting said leg piece thereon, said supporting surface sloping backward with respect to a line drawn upwardly from the position of said supporting piece and tangent to a circle drawn with its center at said first couple and passing said supporting surface.

6. The mechanism of claim 5 wherein said supporting surface is substantially perpendicular to said vibratory direction.

7. The mechanism of claim 4 wherein said supporting piece is made of an elastic material.

8. The mechanism of claim 4 further comprising a clamping means for removably attaching a backward end part of said trough to said base.

9. The mechanism of claim 1 wherein said first and second couplers are located backward of the center of gravity of said trough, said mechanism further comprising a first engaging means attached to said trough and farther backward of said second coupler and a second engaging means attached to a backward part of said base for engaging with said first engaging means to thereby prevent said trough from forwardly rotating around said second coupler.

10. The mechanism of claim 1 wherein said coupling direction is substantially perpendicular to said direction of vibration.

11. In a vibratory feeder having a base which has an upper surface and is adapted to be vibrated in a specified direction of vibration having a horizontal component, a mechanism for attaching to said base a trough for receiving articles and transporting said received articles forward thereon, said trough having a lower surface which is opposite and parallel to said upper surface of said base, said mechanism comprising:

a first coupler attached to said upper surface of said base; and a second coupler attached to said lower surface of said trough and being in a tightly engaged relationship with said first coupler by the weight of said trough, either one of said first and second couplers having an indentation in a specified coupling direction and the other of said first and second couplers having a protrusion also in said coupling direction and adapted to be inserted in said coupling direction into said indentation to thereby establish said engaged relationship between said first and second couplers, said coupling direction being transverse to said direction of vibration and oblique to the plane of said upper and lower surfaces, vibratory acceleration of said base applying a first force on said second coupler and the load from said trough applying a second force on said second coupler, said coupling direction being such that the vector sum of said first and second forces always has along said coupling direction a downward component which tends to keep said first and second couplers in said engaged relationship independent of the magnitude of said first force and to prevent said first and second couplers from sliding with respect to each other in said direction of vibration, said first and second couplers being at a forward position on said base; and a leg piece attached to a backward position on said lower surface of said trough and adapted to rest on said upper surface of said base, wherein vibrations of said base are effectively propagated to said trough.

12. The mechanism of claim 11 wherein said indentation is formed as a groove with tapered inner walls and said protrusion is formed with tapered outer walls which match said tapered inner walls when said couplers are engaged together.

13. The mechanism of claim 11 wherein said base is adapted to vibrate in a specified vibratory direction and said specified coupling direction is substantially perpendicular to said vibratory direction.

14. The mechanism of claim 11 wherein said first and second couplers are located backward of the center of gravity of said trough, said mechanism further comprising a first engaging means attached to said trough and farther backward of said second coupler and a second engaging means attached to a backward part of said base for engaging with said first engaging means to thereby prevent said trough from forwardly rotating around said second coupler.

15. The mechanism of claim 11 wherein said coupling direction is substantially perpendicular to said direction of vibration.

* * * * *